United States Patent
Chen et al.

(10) Patent No.: US 6,959,396 B2
(45) Date of Patent: Oct. 25, 2005

(54) METHOD AND APPARATUS FOR REDUCING CLOCK SKEW IN AN INTEGRATED CIRCUIT

(75) Inventors: Chien-Ming Chen, Changhua Hsien (TW); Ming-Hsien Lee, Hsinchu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 602 days.

(21) Appl. No.: 09/986,727

(22) Filed: Nov. 9, 2001

(65) Prior Publication Data

US 2003/0093704 A1    May 15, 2003

(51) Int. Cl.⁷ ................................ G06F 1/04
(52) U.S. Cl. .................. 713/500; 713/400; 713/503
(58) Field of Search ................ 713/400, 401, 713/500, 501, 502, 503; 327/41, 99, 213; 375/354

(56) References Cited

U.S. PATENT DOCUMENTS

| | | | |
|---|---|---|---|
| 5,274,678 A * | 12/1993 | Ferolito et al. ............. 375/357 |
| 5,483,185 A * | 1/1996 | Scriber et al. ................ 327/99 |
| 5,517,638 A * | 5/1996 | Szczepanek ................ 713/401 |
| 5,758,132 A * | 5/1998 | Strahlin ...................... 713/501 |
| 5,758,136 A * | 5/1998 | Carlson ....................... 713/501 |
| 5,774,699 A * | 6/1998 | Nagae ........................ 713/400 |
| 6,516,422 B1 * | 2/2003 | Doblar et al. ............... 713/503 |

* cited by examiner

Primary Examiner—Thuan Du
(74) Attorney, Agent, or Firm—Birch, Stewart, Kolasch & Birch, LLP

(57) ABSTRACT

A method is provided to reduce clock skew in an integrated circuit having a number of circuit blocks, which comprises the following steps. A first source clock coupled to a clock input terminal of a first circuit block within the circuit blocks is provided, as is a second source clock coupled to a clock input terminal of a second circuit block within the circuit blocks. When the second circuit block is configured to operate in synchronization with the first circuit block, the clock input terminal of the second circuit block is switched to the first source clock, and thus both the first circuit block and the second circuit block can operate in accordance with the same first source clock.

11 Claims, 3 Drawing Sheets

METHOD AND APPARATUS FOR REDUCING CLOCK SKEW IN AN INTEGRATED CIRCUIT

FIELD OF THE INVENTION

The present invention relates generally to the operation of integrated circuits and, in particular, to a method and apparatus for reducing clock skew between different circuit blocks of an integrated circuit.

BACKGROUND OF THE INVENTION

In modern integrated circuit (IC) chip designs, multiple clocks may be desired or required in order to provide various operating clock rates within an IC chip. Allowing the IC chip to operate at various operating clock rates can achieve better performance and compatibility while working with a variety of peripheral devices. A typical personal computer chipset provides at least four types of clock inputs, for example, CPU clock, DRAM clock, PCI clock, and AGP clock, to control the respective circuit blocks. These clocks allow the chipset to communicate with host bus, DRAM bus, PCI bus, AGP bus, and others. Moreover, depending on their functionality, each bus can work at different clock rates to achieve better performance.

When control information and data transfer between different circuit blocks are necessary, the signals crossing through several clock domains must be handled before they are used if clock rates related to these circuit blocks are different. In other words, the signals from a source clock domain must be resynchronized to the clock of a destination clock domain by a synchronizer. However, since the latency of a typical synchronizer is one or two cycles depending on the relationship between the source and the destination clock domains, it is difficult to attain a reliable performance. On the other hand, the signals may bypass the synchronizer if the source and the destination clock domains have the same clock rate and phase. In that case, the extra one or two cycles can be saved and better performance can thus be achieved. For instance, in a typical personal computer, the clock rate of host bus is close to the clock rate of DRAM bus. These two clock rates may even be the same in some configurations. In bypassing the synchronizer, the latency caused by the synchronizer can be avoided.

In a traditional computer system, different clocks are from different output pins of a clock generator which is another IC chip on the computer motherboard. Hence, there is a considerable skew between these clocks. As depicted in FIG. 1, clock generator 10 provides 3 source clocks CLK1, CLK2 and CLK3, by way of buffers 20, to 3 different circuit blocks. For example, circuit block 30a is responsible for functions associated with host bus, circuit block 30b is responsible for functions associated with DRAM bus and circuit block 30c provides functions associated with PCI bus. Once clock signals pass through respective phase locked loop (PLL) unit 34 of each circuit block then propagate to flip-flops 38 via clock trees 36, clock skews will occur as a result. In designing an IC chip, it is contemplated to minimize such clock skews as much as possible. The clock skew caused by clock trees 36 is generally constant, therefore, it can be minimized by adjusting the phase of the clock signal. Moreover, for current computer chipsets, the clock rates of host bus and DRAM bus are 100 or 133 MHz. As a result, there are four combinations for the system clock configurations, two in synchronous operation mode: 100 MHz/100 MHz, 133 MHz/133 MHz, and two in asynchronous operation mode: 100 MHz/133 MHz, 133 MHz/100 MHz. Most computer chipsets support these two operation modes. As described above, a computer system working in synchronous operation mode may achieve better performance. Nevertheless, as the clock rates of computer systems increase dramatically, the data may no longer be valid if there are clock skews within the IC chips and systems. With reference to FIG. 1, the clock of circuit block 30a and the clock of circuit block 30b are received from CLK1 and CLK2 respectively. For an intrinsic clock skew between CLK1 and CLK2, circuit blocks 30a, 30b cannot work at the highest clock rates of the synchronous operation mode in order to avoid data errors caused by the clock skew.

Accordingly, what is desired is a method and apparatus for reducing clock skew between different circuit blocks of an IC chip when the chip works at a synchronous operation mode.

SUMMARY OF THE INVENTION

It is one object of the present invention to provide a method and apparatus for reducing clock skew in an integrated circuit chip working in synchronous operation mode.

The present invention is a method and apparatus for reducing clock skew in an integrated circuit having a plurality of circuit blocks. Briefly, the method comprises the following steps. A first source clock coupled to a clock input terminal of a first circuit block within the circuit blocks, and a second source clock coupled to a clock input terminal of a second circuit block within the circuit blocks are provided. Then, an operation mode signal is provided and a first state to the operation mode signal is set, such that the second circuit block operates in synchronization with the first circuit block. Hence, the clock input terminal of the second circuit block to the first source clock is switched when the second circuit block is configured to operate in synchronization with the first circuit block. As such, the first circuit block and the second circuit block both operate in accordance with the same first source clock.

The present invention is embodied in an apparatus comprising a first multiplexer and a second multiplexer. An output terminal of the first multiplexer is coupled to a clock input terminal of a first circuit block within the circuit blocks. A first input terminal of the first multiplexer is coupled to a first source clock, and a second input terminal of the first multiplexer is coupled together to the first input terminal of the first multiplexer, wherein a selection terminal of the first multiplexer receives an operation mode signal. An output terminal of the second multiplexer is coupled to a clock input terminal of a second circuit block within the circuit blocks. A first input terminal of the second multiplexer is coupled to the first source clock, and a second input terminal of the second multiplexer is coupled to a second source clock, wherein a selection terminal of the second multiplexer receives the operation mode signal. Further, the first and the second multiplexers have substantially the same architecture, such that a signal of the first source clock, propagated by the first and the second multiplexers respectively, has substantially the same delay.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
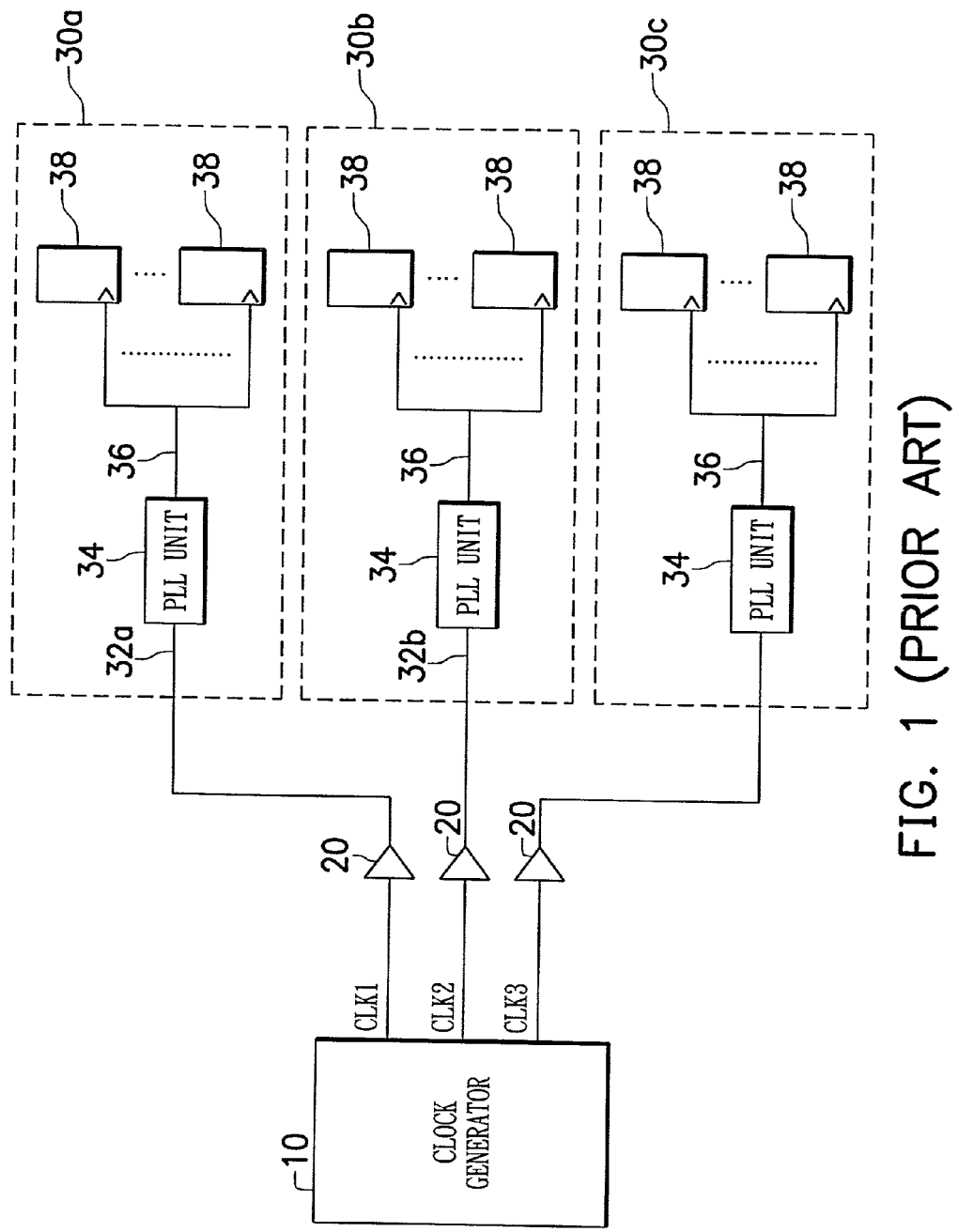
FIG. 1 is a block diagram illustrating an exemplary clock input circuit of an IC chip in accordance with prior art.

Analyzing from an exemplary clock input circuit of an IC chip in accordance with prior art in FIG. 1, the clock skew between flip-flops 38 of circuit blocks 30a and 30b includes three factors: the inaccuracy of PLL unit 34 of circuit block 30a, the inaccuracy of PLL unit 34 of circuit block 30b, and clock skew between CLK1 and CLK2 of clock generator 10. The present invention is directed to the clock skew caused by different source clocks, therefore, the present invention discloses a scheme that dynamically switches source clocks, instead of applying fixed source clocks, to different circuit blocks.

Figure 2:
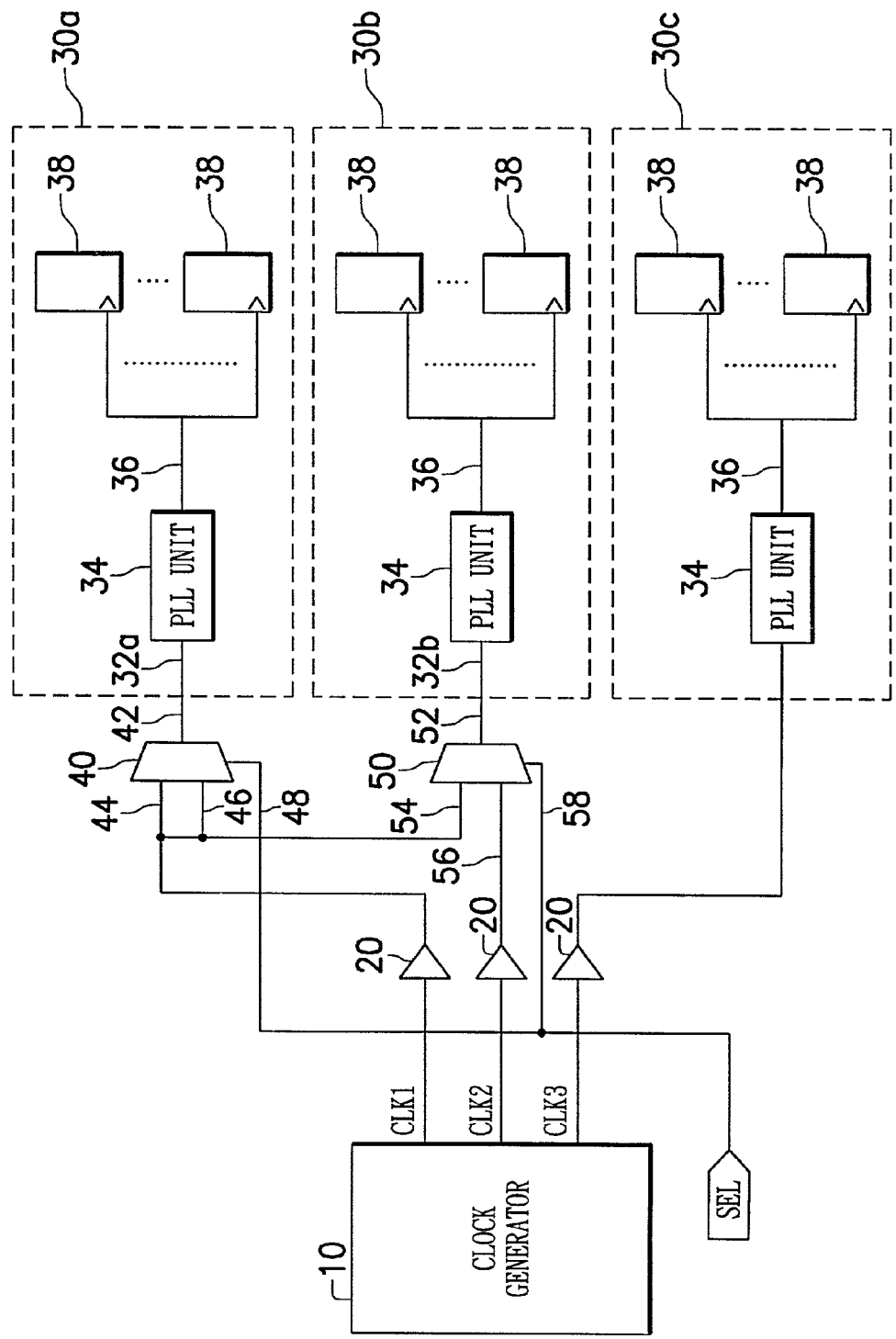
FIG. 2 is a block diagram illustrating a preferred clock input circuit of an IC chip in accordance with the present invention.

FIG. 2 is a block diagram that illustrates a preferred clock input circuit of an IC chip in accordance with the present invention. It is understood that components shown in FIG. 2 are similar to components shown in FIG. 1, and are identified by the same reference numbers. According to the present invention, one multiplexer 40 is added between circuit block 30a and the source clock CLK1, another multiplexer 50 is added between circuit block 30b and the second source clock CLK2, respectively. Output terminal 42 of multiplexer 40 is coupled to clock input terminal 32a of circuit block 30a. Input terminal 44 of multiplexer 40 is coupled to CLK1 by way of buffer 20, and input terminal 46 of multiplexer 40 is coupled together to the input terminal 44. Selection terminal 48 of multiplexer 40 receives an operation mode signal SEL. Output terminal 52 of multiplexer 50 is coupled to clock input terminal 32b of circuit block 30b. Input terminal 54 of multiplexer 50 is coupled to input terminal 46 of multiplexer 40, to receive the source clock CLK1, and input terminal 56 of multiplexer 50 is coupled to CLK2 by way of buffer 20. Likewise, selection terminal 58 of multiplexer 50 receives the operation mode signal SEL. When circuit block 30b is configured to operate in synchronization with circuit block 30a, the operation mode signal SEL is set at a first state, for example a logic '0', to switch clock input terminal 32b of circuit block 30b to CLK1 by multiplexer 50. Thus, circuit block 30a and circuit block 30b both operate in accordance with the same source clock CLK1. As such, the preferred embodiment avoids the clock skew that is caused by adopting different and fixed source clocks in prior art. The purpose of multiplexer 40 is that the signal from source clock CLK1, propagated by multiplexers 40 and 50 respectively, has substantially the same delay. That is, the time spent for the clock signal to arrive at circuit block 30a and circuit block 30b is the same in synchronous operation mode. In other words, multiplexers 40 and 50 have substantially the same architecture. It should be understood to those skilled in the art that other suitable delay circuits are contemplated to replace multiplexer 40 by the principles of the invention. Other selection devices may also substitute for multiplexer 50, as will be appreciated by those skilled in the art. If the operation mode signal SEL is set in a second state, for example a logic '1', it makes circuit block 30b operate asynchronously to circuit block 30a. Clock input terminal 32b of circuit block 30b is switched to the source clock CLK2 by multiplexer 50. Therefore, circuit block 30a operates in accordance with source clock CLK1 and circuit block 30b operates in accordance with source clock CLK2 independently.

Figure 3C:
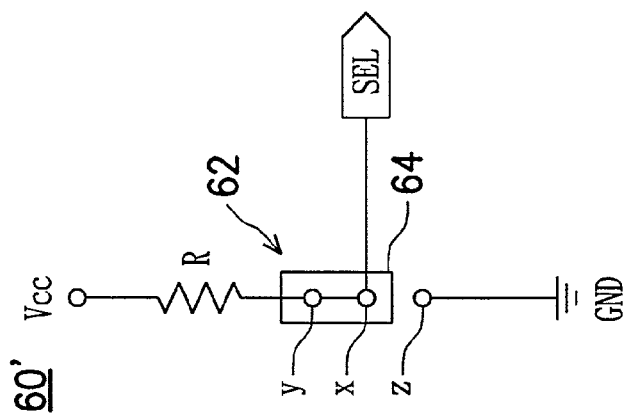
FIG. 3C is a schematic diagram illustrating another jumper setting in accordance with an embodiment of the present invention.
Figure 3B:
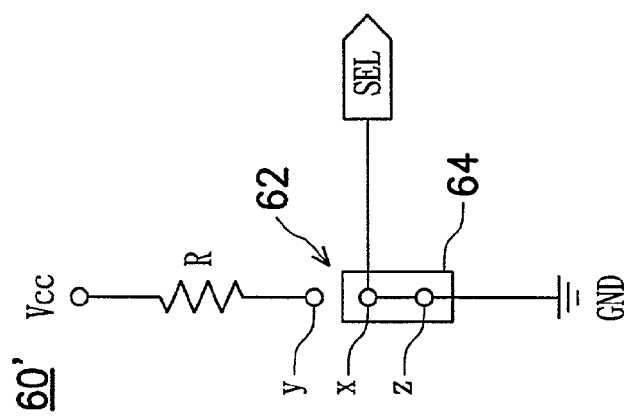
FIG. 3B is a schematic diagram illustrating a jumper setting in accordance with an embodiment of the present invention.
Figure 3A:
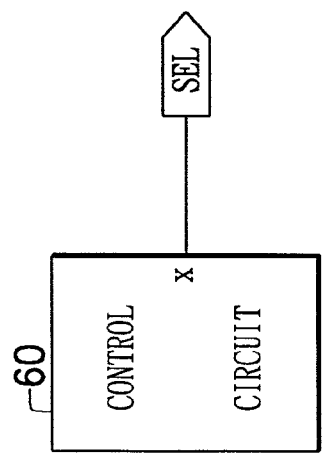
FIG. 3A is a block diagram illustrating a control circuit of the present invention.

The operation mode signal SEL is provided by a control circuit. In one embodiment, as illustrated in FIG. 3A, output terminal X of control circuit 60 is coupled to selection terminal 48 of multiplexer 40 and selection terminal 58 of multiplexer 50. Control circuit 60 automatically outputs the operation mode signal SEL in response to a setting of a basic input/output system (BIOS). Alternatively, the operation mode signal SEL is provided by manually setting control circuit 60' which is constructed of a jumper 62 in another embodiment. With reference to FIGS. 3B~3C, terminal Y of jumper 62 is connected to power Vcc via a resistor R. Another terminal Z is connected to ground GND. As depicted in FIG. 3B, the presence of metal piece 64 connecting terminals X and Z enable terminal X of jumper 62 to output a logic '0'. Besides, as depicted in FIG. 3C, the presence of metal piece 64 connecting terminals X and Y enable terminal X of jumper 62 to output a logic '1'. Accordingly, the operation mode of the IC chip can be set depending on a user's requirement.

The present invention discloses a method and apparatus for reducing clock skew in an IC chip working at synchronous operation mode. Instead of using fixed and different source clocks as the prior art, the clock skew is overcome by switching source clocks dynamically.

Although one embodiment of the invention has been illustrated in the accompanying drawings and described herein, it will be apparent to those skilled in the art to which the invention pertains from the foregoing description that variations and modifications of the described embodiment may be made without departing from the true spirit and scope of the invention. Accordingly, it is intended that the invention shall be limited only to the extent required by the appended claims and the rules and principles of applicable law.

What is claimed is:

1. A method for reducing clock skew in an integrated circuit having a plurality of circuit blocks, the method comprising:
    providing a first source clock coupled to a clock input terminal of a first circuit block within the circuit blocks and to a first input terminal of a first multiplexer;
    providing a second source clock coupled to a second input terminal of the first multiplexer, wherein an output terminal of the first multiplexer is coupled to a clock input terminal of a second circuit block within the circuit blocks; and switching the clock input terminal of the second circuit block to the first source clock by the first multiplexer when the second circuit block is configured to operate in synchronization with the first circuit block, thereby operating the first and second circuit blocks in accordance with the same first source clock.

2. The method of claim 1 further comprising:

providing an operation mode signal to the first multiplexer; and setting a first state to the operation mode signal, thereby operating the second circuit block in synchronization with the first circuit block.

3. The method of claim 2 further comprising:

setting a second state to the operation mode signal, wherein the second circuit block operates asynchronously to the first circuit block when the operation mode signal is at the second state; and switching the clock input terminal of the second circuit block to the second source clock by the first multiplexer, thereby independently operating the first circuit block in accordance with the first source clock and the second circuit block in accordance with the second source clock.

4. The method of claim 1 further comprising:

providing the first source clock coupled to first and second input terminals of a second multiplexer, wherein an output terminal of the second multiplexer is coupled to the clock input terminal of the first circuit block.

5. An apparatus for reducing clock skew in an integrated circuit having a plurality of circuit blocks, comprising:

a first multiplexer, an output terminal of the first multiplexer coupled to a clock input terminal of a first circuit block within the circuit blocks, a first input terminal of the first multiplexer coupled to a first source clock, and a second input terminal of the first multiplexer coupled together to the first input terminal of the first multiplexer, wherein a selection terminal of the first multiplexer receives an operation mode signal; and a second multiplexer, an output terminal of the second multiplexer coupled to a clock input terminal of a second circuit block within the circuit blocks, a first input terminal of the second multiplexer coupled to the first source clock, and a second input terminal of the second multiplexer coupled to a second source clock, wherein a selection terminal of the second multiplexer receives the operation mode signal;

wherein the first and the second multiplexers have substantially the same architecture, such that a signal of the first source clock, propagated by the first and the second multiplexers respectively, has substantially the same delay.

6. An apparatus for reducing clock skew in an integrated circuit having a plurality of circuit blocks, comprising:

a first multiplexer, an output terminal of the first multiplexer coupled to a clock input terminal of a first circuit block within the circuit blocks, a first input terminal of the first multiplexer coupled to a first source clock, and a second input terminal of the first multiplexer coupled together to the first input terminal of the first multiplexer, wherein a selection terminal of the first multiplexer receives an operation mode signal;

a second multiplexer, an output terminal of the second multiplexer coupled to a clock input terminal of a second circuit block within the circuit blocks, a first input terminal of the second multiplexer coupled to the first source clock, and a second input terminal of the second multiplexer coupled to a second source clock, wherein a selection terminal of the second multiplexer receives the operation mode signal; and a control circuit, an output terminal of the control circuit coupled to the selection terminal of the first multiplexer and the selection terminal of the second multiplexer, to provide the operation mode signal on the output terminal of the control circuit;

wherein the first and the second multiplexers have substantially the same architecture, such that a signal of the first source clock, propagated by the first and the second multiplexers respectively, has substantially the same delay.

7. The apparatus of claim 6, wherein the control circuit outputs the operation mode signal in response to a setting of a basic input/output system (BIOS).

8. The apparatus of claim 6, wherein the control circuit is constructed of a jumper.

9. An apparatus for reducing clock skew in an integrated circuit having a plurality of circuit blocks, comprising:

a first circuit block, a clock input terminal of the first circuit block coupled to a first source clock;

a first multiplexer, a first input terminal of the first multiplexer coupled to the first source clock, and a second input terminal of the first multiplexer coupled to a second source clock, wherein a selection terminal of the first multiplexer receives an operation mode signal; and a second circuit block, a clock input terminal of the second circuit block coupled to an output terminal of the first multiplexer.

10. The apparatus of claim 9 further comprising a second multiplexer, first and second input terminals of the second multiplexer coupled to the first source clock, and an output terminal of the second multiplexer coupled to the clock input terminal of the first circuit block, wherein a selection terminal of the second multiplexer receives the operation mode signal.

11. The apparatus of claim 9, wherein the first and the second multiplexers have substantially the same architecture, such that a signal of the first source clock, propagated by the first and the second multiplexers respectively, has substantially the same delay.

* * * * *